United States Patent [19]
Marioni

[11] Patent Number: 5,088,902
[45] Date of Patent: Feb. 18, 1992

[54] PISTON TYPE METERING PUMP

[75] Inventor: Elio Marioni, Dueville, Italy

[73] Assignee: Askoll S.p.A., Povolaro Dueville, Italy

[21] Appl. No.: 612,378

[22] Filed: Nov. 14, 1990

[30] Foreign Application Priority Data

Nov. 17, 1989 [IT] Italy ........................ 41748 A/89
May 14, 1990 [IT] Italy ........................ 41600 A/90

[51] Int. Cl.⁵ ........................ F04B 35/04; F04B 39/10
[52] U.S. Cl. ........................ 417/415; 137/512.4; 137/852; 417/454; 417/571
[58] Field of Search ............ 417/415, 454, 571, 413; 137/852, 512.4, 859

[56] References Cited

U.S. PATENT DOCUMENTS

| | | | |
|---|---|---|---|
| 2,260,180 | 10/1941 | Herder | 417/571 |
| 3,131,646 | 5/1964 | Parrott | 137/859 X |
| 3,416,557 | 12/1968 | Schoenecker et al. | 137/859 X |
| 3,664,774 | 5/1972 | Tupper et al. | 417/571 X |
| 3,730,217 | 5/1973 | Gute | 137/512.4 |
| 4,422,831 | 12/1983 | Schmid | 417/440 X |
| 4,614,479 | 9/1986 | Liu | 417/415 |
| 4,710,109 | 12/1987 | Ballu | 417/454 |

FOREIGN PATENT DOCUMENTS

| | | | |
|---|---|---|---|
| 588113 | 4/1925 | France | 417/415 |
| 104592 | 3/1942 | Sweden | 417/571 |
| 2197693 | 5/1988 | United Kingdom | 417/454 |

Primary Examiner—Leonard E. Smith
Attorney, Agent, or Firm—Guido Modiano; Albert Josif

[57] ABSTRACT

The piston type metering pump includes a synchronous electric motor, for example of the permanent-magnet type, which transmits its rotary motion to a speed reducer which is in turn associated, by means of a connecting rod-crank kinematic system, to a piston which is slidable in a hollow body in which it defines a variable-volume chamber. The chamber has, at its top, openings on which fluid intake and discharge valve means act.

20 Claims, 6 Drawing Sheets

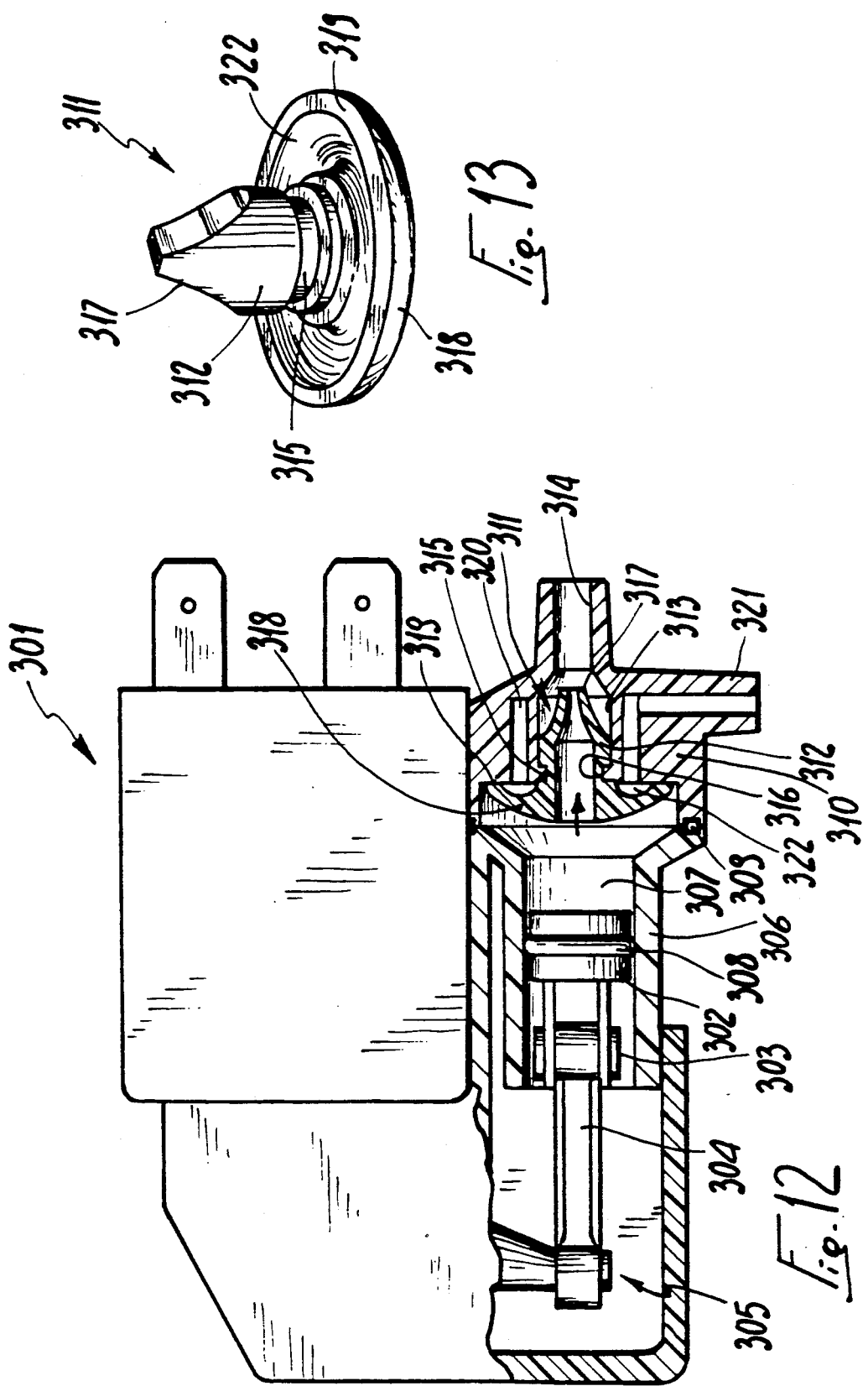

PISTON TYPE METERING PUMP

BACKGROUND OF THE INVENTION

The present invention relates to a piston type metering pump, particularly for metering liquid detergents in washing machines.

The use of liquid detergents for washing machines, which produce on the washing qualitatively better results with respect to the powder detergents used so far, is currently becoming increasingly popular.

However, washing machines are currently provided with devices for metering the powder detergent during the various washing steps which are absolutely unsuitable for being used with liquid detergent.

Said metering devices are in fact generally constituted by small compartments into which the powder detergent is poured; the detergent is gradually dissolved by a current of water which is caused to flow, when required, in said compartments.

A dose of liquid detergent poured into said compartments would end up completely inside the washing containers upon the first flow of the water current.

Dosage containers to be inserted inside the washing tumbler, among the washing, are currently used for the dosage of liquid detergents.

Said dosage containers have an appropriate opening out of which the detergent flows during the washing cycle.

However, this is only a very rudimentary solution to the problem, since the dosage is still very approximate.

SUMMARY OF THE INVENTION

The aim of the present invention is to provide a pump which can meter preset amounts of fluids for preset periods of time.

A consequent primary object is to provide a metering pump which can be conveniently installed in washing machines for the dosage of liquid detergents.

Another important object is to provide a metering pump which can also be installed in other household appliances, such as for example dishwashers or others.

Still another object is to provide a pump which can perform an extremely precise metering.

Another object is to provide a pump which is compact and small so that it can be installed without problems in small spaces.

Still another object is to provide a pump which requires low energy consumption for its actuation.

Not least object is to provide a pump which can be manufactured at low cost with conventional production facilities.

This aim, these objects and others which will become apparent hereinafter are achieved by a metering pump which is characterized in that it comprises a synchronous electric motor which is suitable for transmitting rotary motion to speed reduction means which are associated, by virtue of means suitable for converting rotary motion into reciprocating motion, with a piston element which is slidable in a hollow body in which it defines a variable-volume chamber which is associated with valve means for the intake and discharge of fluid.

BRIEF DESCRIPTION OF THE DRAWINGS

Further characteristics and advantages of the invention will become apparent from the detailed description of some embodiments thereof, illustrated only by way of non-limitative example in the accompanying drawings, wherein:

FIG. 12 is a partially sectional plan view of a third model of pump;

FIG. 13 is a perspective view of an intake and discharge valve comprised within the pump shown in FIG. 12.

DESCRIPTION OF THE PREFERRED EMBODIMENTS

Figure 1:
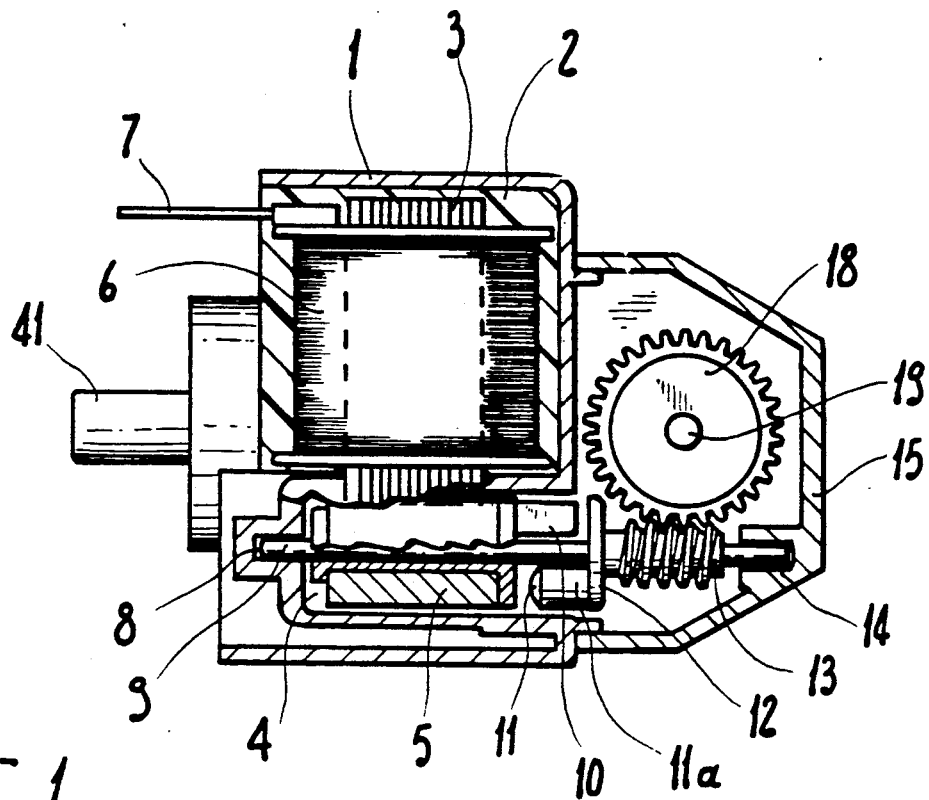
FIG. 1 is a partial sectional front elevation view of a first embodiment of a pump according to the invention, taken along a plane which passes through the motor axis and the centerline of the reducer.
Figure 2:
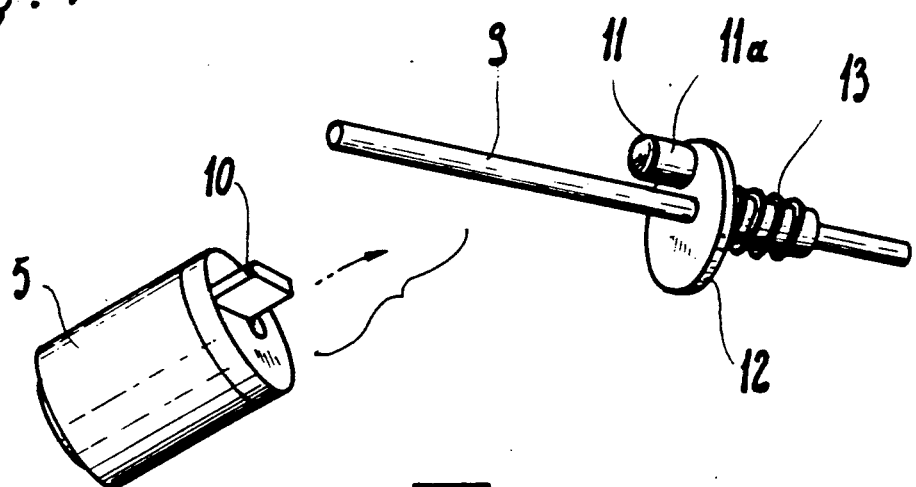
FIG. 2 is a perspective detail view illustrating the coupling between the rotor of the motor and its shaft of the pump shown in FIG. 1.
Figure 3:
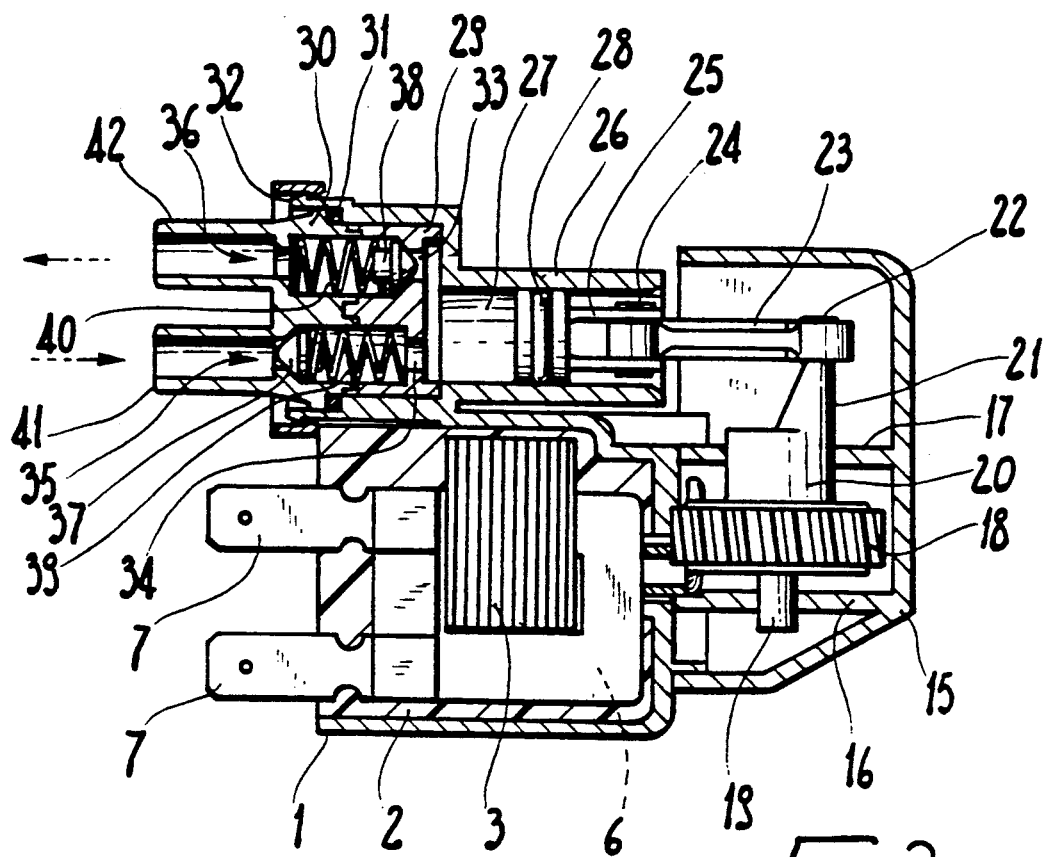
FIG. 3 is a sectional plan view of the pump shown in FIG. 1.
Figure 4:
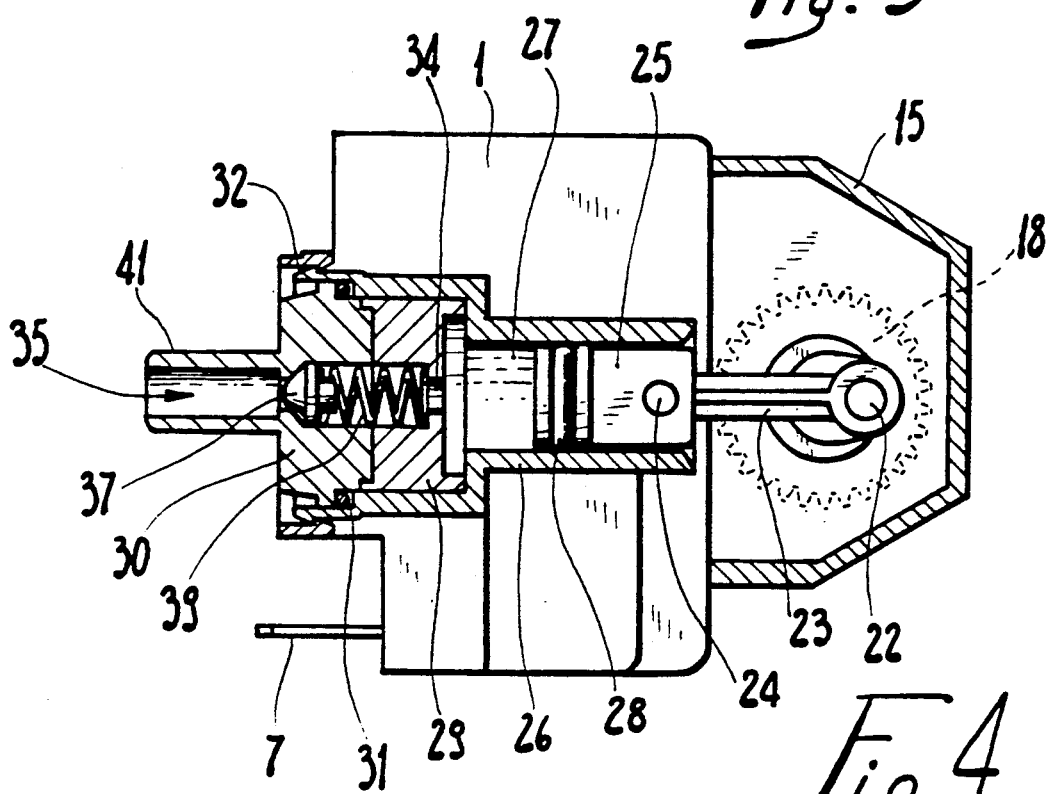
FIG. 4 is a sectional view of the pump shown in FIG. 1 in the region of the piston and of the valves.
Figure 6:
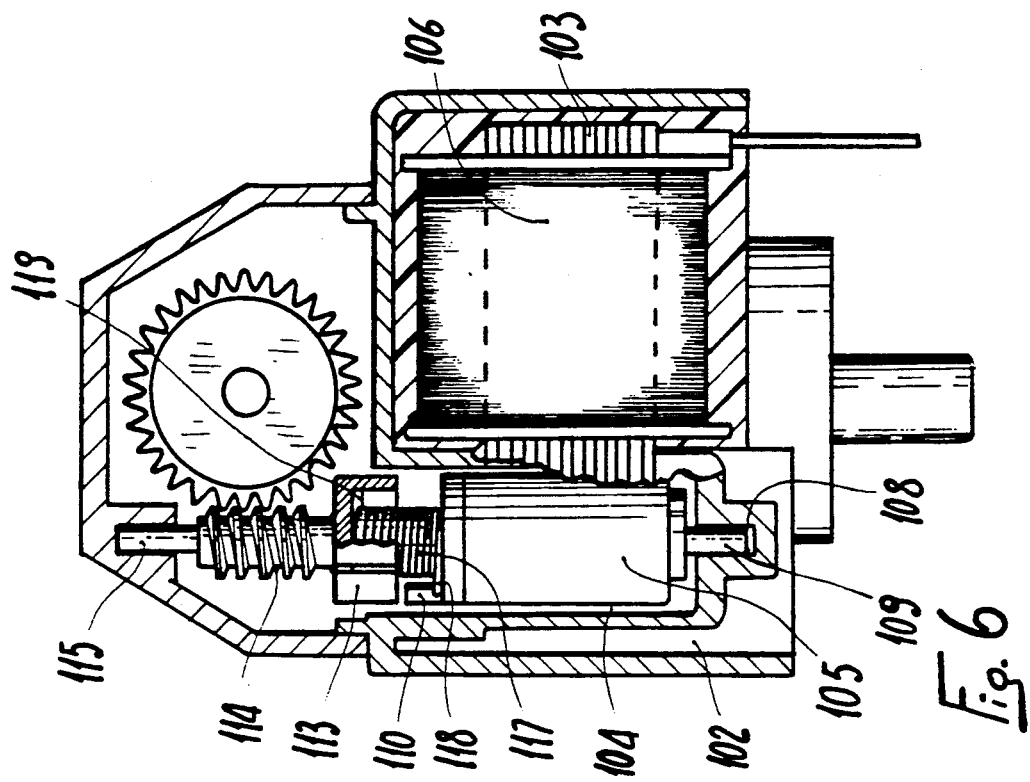
FIG. 6 is a sectional elevation view of the pump shown in FIG. 5, taken along a plane which passes through the axis of the piston.
Figure 5:
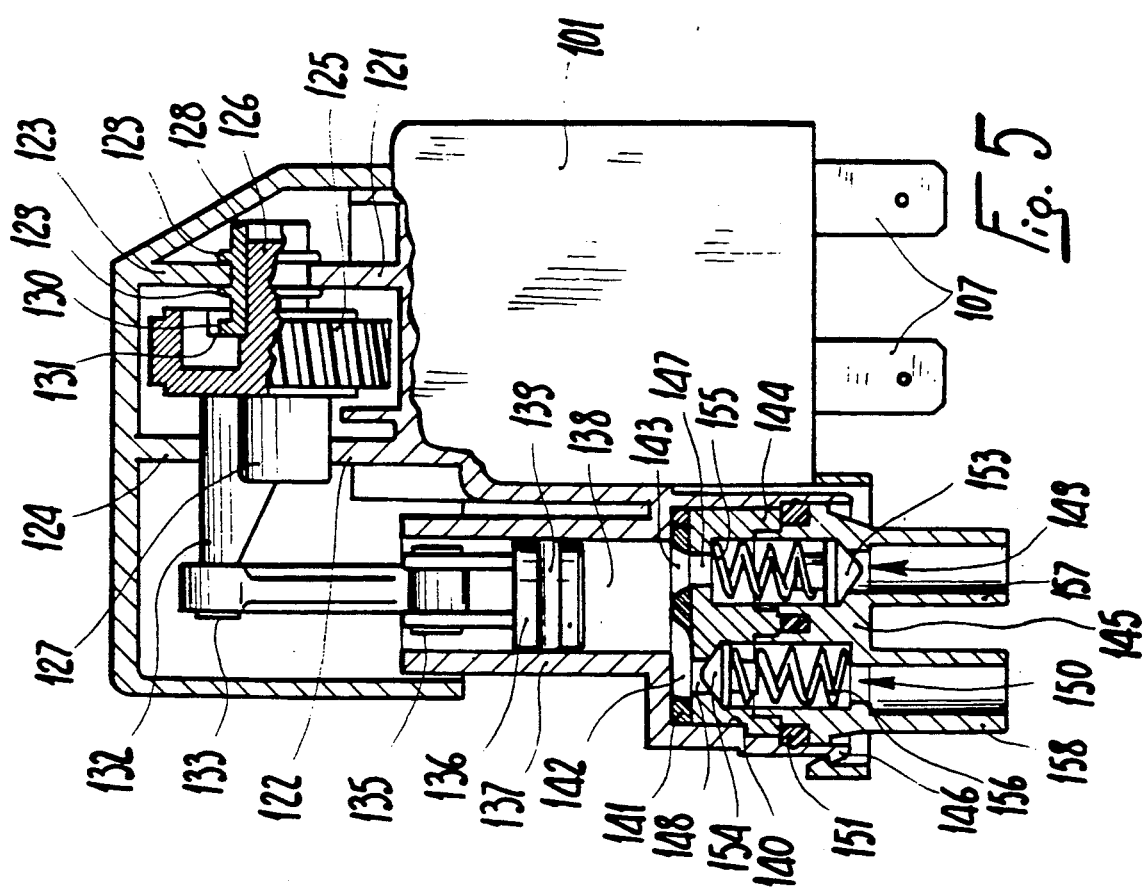
FIG. 5 is a partial sectional plan view of a second embodiment of a pump according to the invention, taken along a longitudinal plane.
Figure 7:
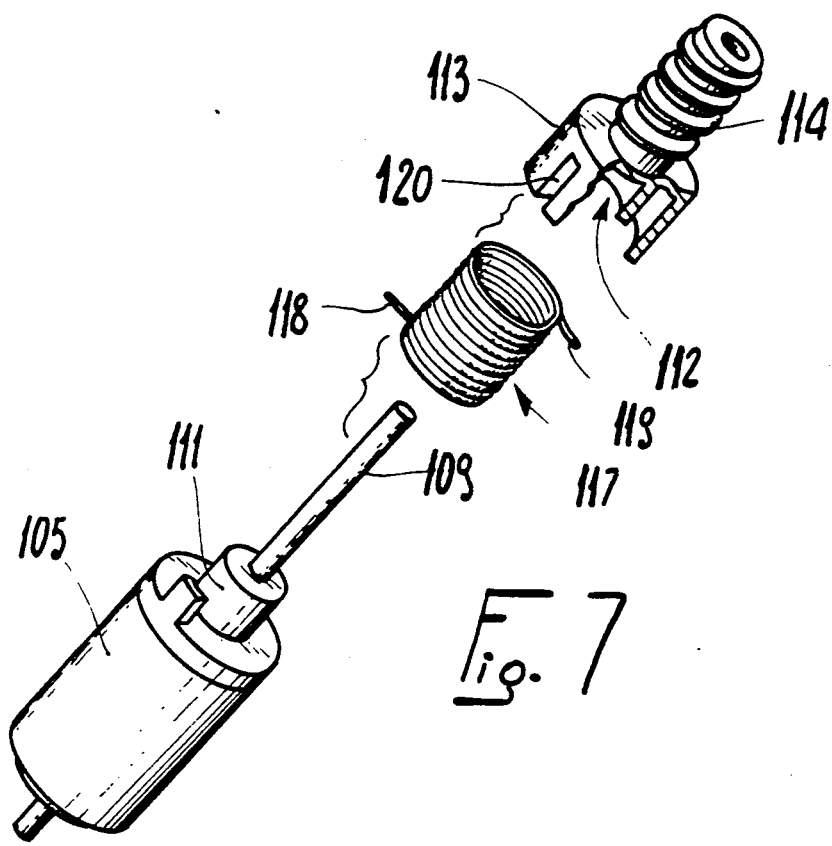
FIG. 7 is a perspective detail view of the coupling between the rotor and the reducer of the pump shown in FIG. 5.

With reference to FIGS. 1 to 4, the first embodiment of the metering pump, according to the invention, comprises a body 1, advantageously made of plastic material, which internally defines a first chamber 2, in which the stator pack 3 of a permanent-magnet synchronous motor is embedded in epoxy resin, and a second cylindrical chamber 4, which is separate from said first chamber and in which the rotor 5 of said motor is accommodated.

Two Faston connectors 7 for connection to the electric mains extend out of the resin-embedded region from said stator pack 3, which is appropriately provided with electric windings 6.

Said second chamber 4 has an open end and an end provided with an axial seat 8 for the insertion of a corresponding end of a metallic shaft 9 which supports said rotor 5 so that it is free to rotate about its longitudinal axis.

Said rotor 5 has, at the region of the open end of said second chamber 4, a substantially radial tab 10 which is suitable for rotationally entraining a corresponding cylindrical tab 11 which is annularly embraced by a shock-absorbing rubber element 11a and extends eccentrically from a disk-like element 12 which is advantageously axially monolithic with a worm screw 13 which is advantageously made of plastic material and is rigidly associated with the shaft 9, the second end whereof is inserted in a seat 14 which is defined inside a housing or casing 15, also advantageously made of plastic material, which is fixed to the body 1 with screws which are not illustrated in the figures.

Said shaft 9 is appropriately free to rotate in its end seats 8 and 14.

Two parallel walls 16 and 17 extend inside said housing 15, and a gearwheel 18 is rotationally coupled therebetween and meshes with said worm screw 13.

Said gearwheel 18 is advantageously monolithic with its own rotation pivots 19 and 20, the second of which has a considerably larger diameter than the first and has an eccentric tab 21 with an articulation pivot 22 for the end of a connecting rod 23 the opposite end whereof is advantageously monolithic with a pivot 24 which is rotatably coupled between the walls of a piston 25 which is also made of plastic material and is slidable in a hollow body 26 which is advantageously monolithic with said body 1, in which it defines a variable-volume chamber 27.

Said piston 25, which conveniently has a cylindrical extension, is provided, on its outer surface, with an annular groove in which a sealing O-ring 28 is accommodated.

Said hollow body 26 widens at the top of said chamber 27 and forms an insertion seat for an intermediate element 29 and a cover 30 which is externally associated with an O-ring 31 which is suitable for ensuring the seal on said hollow body 26.

Said cover 30 is advantageously associated with the body 26 by means of snap-together couplings 32.

The intermediate element 29 and the cover 30 are longitudinally traversed by ducts 33 and 34 for the passage of fluid, and corresponding seats for intake and discharge valves, respectively 35 and 36, are defined therein.

Each of said valves 35 and 36, which are conveniently arranged in opposite positions, is constituted by a mushroom-shaped element, respectively 37 and 38, with a conical head accommodated in a complementarily shaped seat, and by a cylindrical helical spring, respectively 39 and 40, which is suitable for biasing the head against the corresponding seat.

Said cover is completed by two connections 41 and 42 which allow to connect it to a hydraulic circuit.

As regards the operation of the first embodiment of the metering pump according to the invention, the rotation of the permanent-magnet motor, the assumed direction of rotation whereof is irrelevant, causes the rotation of the shaft 9 which supports the worm screw 13 which meshes with the gearwheel 18.

The worm screw 13 and the gearwheel 18 perform a considerable speed reduction and transmit the motion to the connecting rod 23 by means of the articulation pivot 22.

The articulation pivot 22 and the connecting rod 23 convert the rotary motion into the reciprocating motion of the piston 25, the stroke whereof in the direction suitable for increasing the volume of the chamber 27 causes a compression of the spring 39 and the intake of liquid through the mushroom-shaped element 37, whereas a stroke in the direction suitable for reducing the volume of the chamber 27 causes the drawn fluid to press on the mushroom-shaped element 38 and on the spring 40, allowing the discharge of said fluid.

Since the permanent-magnet motor is a synchronous electric motor, its rotation rate is fixed and preset, for a constant mains frequency, by the number of polar expansions.

Due to this reason, the amount of fluid drawn and discharged by the piston 25 is constant in the course of time.

In order to perform a perfect dosage of a given amount of fluid, it is sufficient to keep the motor running for the time required by the piston to complete a number of intake and discharge cycles equal to the volume of fluid to be metered divided by the maximum volume of the chamber 27.

By means of the pump according to the invention it is therefore possible to precisely meter, at the appropriate time and in the required amount, a fluid detergent to be introduced in a washing machine, a dishwasher or similar household appliance.

With reference now to FIGS. 5 to 11, a second embodiment of the metering pump according to the invention comprises a body 101 advantageously made of plastic material which is shaped so as to internally define a first chamber 102 in which the stator pack 103 of a permanent-magnet synchronous electric motor is embedded in epoxy resin.

Said body 101 again defines a second chamber 104 which is separate from the first one 102, has a cylindrical extension and internally accommodates the rotor 105 of said motor.

Said stator pack 103 has electric windings 106 from which two Faston connectors 107 for connection to the electric mains extend.

As can be seen in FIGS. 5 to 11, said second chamber 104 has an open end and an end which is provided with an axial seat 108 for the insertion of a corresponding end of an advantageously metallic shaft 109 which supports said rotor 105 so that it is free to rotate about its longitudinal axis.

Said rotor 105 has, at the region of the open end of said second chamber 104, a substantially radial tab 110 and an axial bush 111 which rests head-on on a corresponding axial bush 112 which has the same diameter and extends axially from a bell-shaped element 113 which is advantageously axially monolithic with a worm screw 114 advantageously made of plastic material.

Said worm screw 114 is freely associated with the shaft 109, the second end whereof is inserted in a seat 115 which is defined inside a housing 116, again advantageously made of plastic material, which is fixed to the body 101.

Said axial bushes 111 and 112 are externally embraced by a cylindrical helical metallic spring 117 the ends whereof extend in a radial direction; a first end 118 is in lateral contact with said tab 110 and a second end 119 is inserted in a slot or hole 120 which is present on said bell-shaped element 113.

Two parallel walls 121 and 122 extend from said body 101 and, by cooperating with similar parallel walls 123 and 124 which extend inside the housing 116, are suitable for supporting, in a rotationally coupled manner, a gearwheel 125 which meshes with said worm screw 114.

Said gearwheel 125 is advantageously monolithic with its rotation pivots 126 and 127, the first of which, considerably smaller in diameter than the second one, is inserted in a bearing 128 which is externally provided with annular raised portions 129 which block its axial sliding with respect to the supporting walls.

Said bearing 128 advantageously rests, with one of its annular raised portions 130, in a respective annular seat 131 which is defined laterally on said gearwheel 125.

The second rotation pivot 127 has an eccentric tab 132 with an articulation pivot 133 for the end of a connecting rod 134 the opposite end whereof is advantageously monolithic with a pivot 135 which is rotationally coupled between the walls of a piston 136, again advantageously made of plastic material, which is slidable in a hollow body 137 which is advantageously monolithic with said body 101.

Said piston 136, which conveniently has a cylindrical extension, defines a variable-volume chamber 138 inside the hollow body 137 and has, on its outer surface, an annular groove in which a sealing O-ring 139 is accommodated.

Said hollow body 137 expands at the head of said chamber 138 and forms a seat 140 for the insertion of the valve system of the pump.

Said valve system comprises a first insert 141 in which two fluid passages of appropriate shape, respectively 142 and 143, are defined.

An intermediate element 144 is furthermore inserted in said seat 140 and a cover 145 is associated within the seat 140 of the hollow body 137 for example by means of snap-together couplings 146.

The intermediate element 144 and the cover 145 are longitudinally traversed by fluid passage ducts 147 and 148, and corresponding seats for intake and discharge valves, respectively 149 and 150, are defined therein.

According to the invention, a gasket 151 is interposed between the intermediate element 144 and the cover 145 and is shaped so as to be in contact both with their surfaces and with the lateral surface of the seat 140, so as to prevent any internal recirculation of fluid as well as any outward escape thereof.

Figure 8:
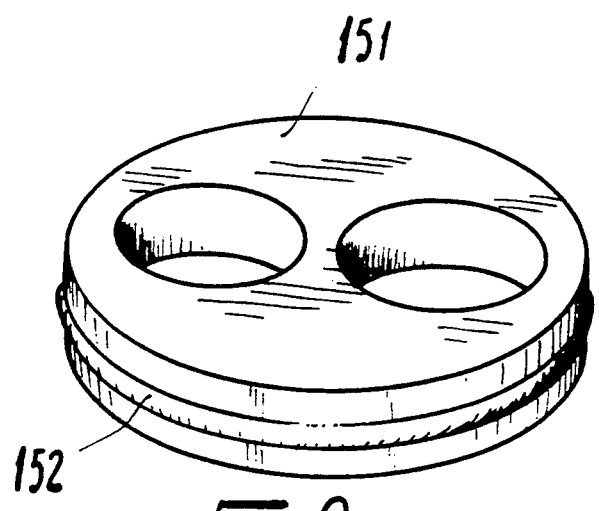
FIG. 8 is a perspective view of a sealing gasket which is applied on the valve means of the pump shown in FIG. 5.

As can be seen in FIG. 8, for this purpose said gasket 151 is appropriately shaped like a figure-eight and has a small circumferential raised portion 152 to be accommodated in a complementarily shaped annular recess of said seat 140.

The compression performed by the cover 145 upon closure also causes the outward expansion of the gasket 151 and of its raised portion 152, producing a seal.

Each of said valves 149 and 150, which are appropriately arranged in opposite positions, is constituted by a mushroom-shaped element, respectively 153 and 154, with a conical head accommodated in a complementarily shaped seat, and by a cylindrical helical spring, respectively 155 and 156, which is suitable for biasing the head against the corresponding seat.

Said cover 145 is completed by two connections 157 and 158 which allow to connect it to a hydraulic circuit.

Figure 9:
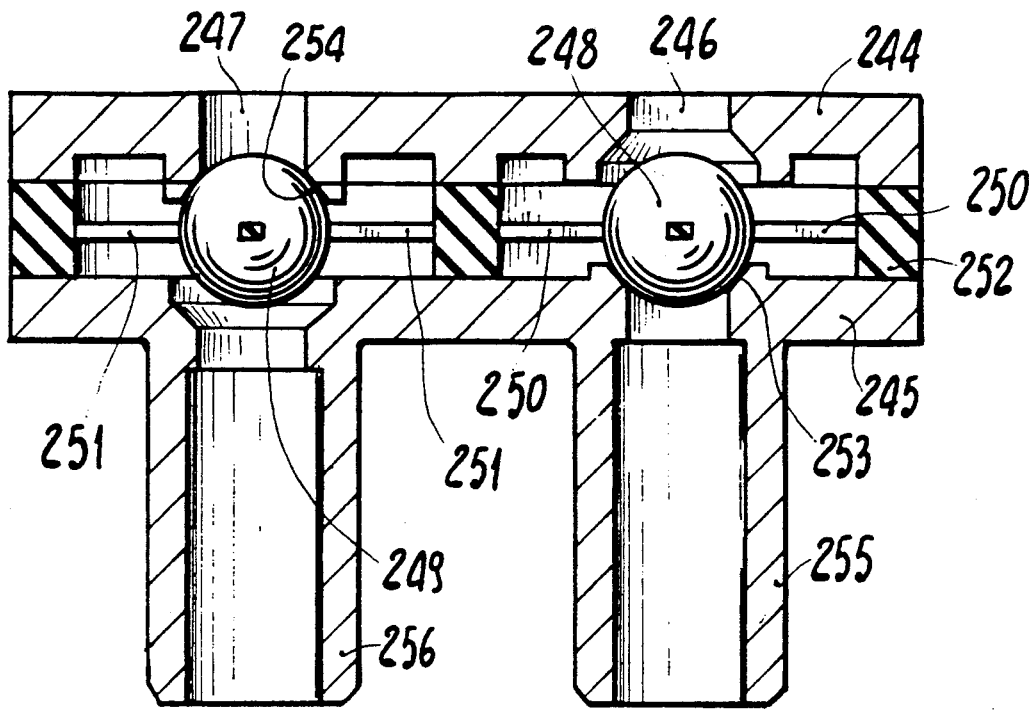
FIG. 9 is a sectional view of a possible further embodiment of the valve means of the pump shown in FIG. 5.
Figure 10:
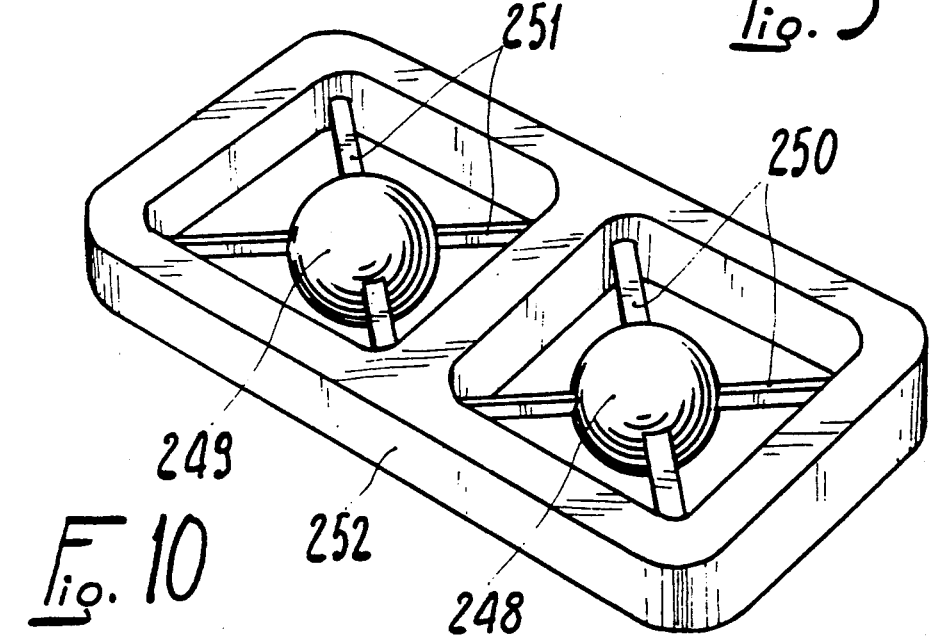
FIGS. 10 and 11 are respectively a perspective view and a sectional elevation view of the sealing gasket comprised within the valve means of FIG. 9.
Figure 11:
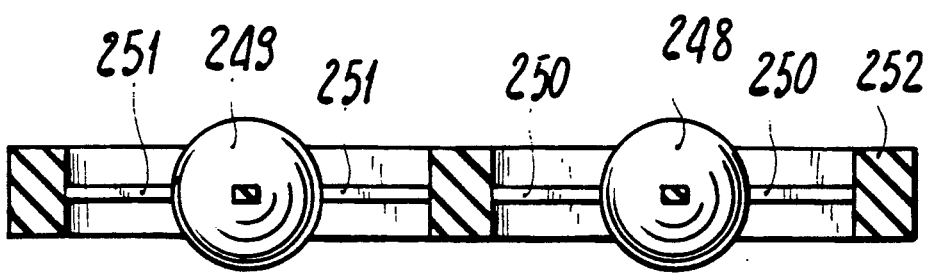

As shown in FIGS. 9-11, the valve system of the pump, according to the invention, can be constituted by two internally hollow elements, respectively an intermediate element 244 and a cover 245, which are again accommodated in an adapted seat at the head of the variable-volume chamber 138 and are longitudinally traversed by fluid passage ducts 246 and 247.

Said elements 244 and 245 have corresponding seats of valves 248 and 249 defined between them; said valves are preferably constituted by balls made of rubber or of a similar material which are monolithic by virtue of supporting spokes, respectively 250 and 251, which connect them to a sealing element 252 substantially in the shape of a figure-eight which is interposed between the intermediate element 244 and the cover 245.

Sealing seats 253 and 254 of the valves 248 and 249 are conveniently arranged in opposite positions, and said spokes 250 and 251 constitute elastic elements which maintain the closure of the fluid passages.

Said cover 245 is completed by two connections 255 and 256 which allow to connect it to a hydraulic circuit.

As regards the effects and operation of the second embodiment of the pump with respect to the first one, according to the invention, said spring 117, regardless of the angular position of the tab 110 when the rotor 105 starts, by making contact with said tab exerts a thrust which causes its loading and therefore an elastic thrust in the opposite direction which is sufficient to give the motor such a torque as to move the worm screw 114 and therefore the entire pump.

The presence of the bearing 128 further facilitates the rotation of the gearwheel 125 and reduces losses due to friction thereof.

With reference now to FIGS. 12 and 13, a third embodiment of the metering pump according to the invention is generally indicated by the reference numeral 301 and comprises a piston 302 to which a pivot 303 is articulated; said piovt is arranged at the end of a connecting rod 304 of a connecting rod-crank kinematic system which actuates it.

Said connecting rod-crank kinematic system, generally indicated by the reference numeral 305, is in turn associated with a gearmotor unit similar to the previous one which is not illustrated and has a permanent-magnet synchronous motor.

Said piston 302, which conveniently has a cylindrical extension, is slidable in a hollow body 306 in which it defines a variable-volume chamber 307, and has, on its outer surface, an annular groove in which a sealing ring 308, for example an O-ring, is accommodated.

A head 310 is fixed on said hollow body 306, for example by means of screws, with the interposition of a sealing ring 309, and supports a valve 311 which has both an intake function and a discharge function.

In particular, said valve 311, which is conveniently made of rubber or of an equivalent material, has an umbrella-like shape and has a tubular body 312 which is inserted in a complementarily shaped axial seat 313 of the head 310 and is connected to the outside by means of an also axial connection 314.

Said tubular body 312 is fixed to the seat 313 due to the insertion of a complementarily shaped raised portion 316 which extends from the seat 313 in an annular recess 315 with which said tubular body is provided.

Advantageously, said tubular body 312 has a beak-shaped nozzle 317 which extends toward the connection 314 and has elastically deformable sealing lips which define or close a rectilinear passage slit.

The perimetric lip of the hood 318 of said valve 311 is elastically deformable and rests on a planar surface 319 which is defined on the head 310 at the outlet of the seat 313.

Said seat 313 is surrounded by an annular chamber 320 which is connected to the outside by means of a connection 321 and to the inside by means of an annular chamber 322 which is formed between the hood 318 and the surface 319.

In practice, the operation of the third embodiment of the pump according to the invention is as follows: the reciprocating motion of the piston 302 alternately causes a suction effect and a pumping effect; the first effect causes the closing deformation of the lips of the hood 318 which causes the fluid to enter through the connection 321, whereas the second effect causes the opening deformation of the lips of the nozzle 317, which cause the fluid drawn into the chamber 307 to escape through the slit defined thereby and through the connection 314.

A single valve therefore performs the dual function of intake valve and discharge valve.

It has thus in practice been observed that the invention has achieved the intended aim and objects.

The pump, according to the invention, is in fact extremely compact and is advantageously mostly made of elements manufactured by injection-molding thermoplastic materials.

The assembly of the various elements is performed with conventional production facilities.

The invention thus conceived is susceptible to numerous modifications and variations, all of which are within the scope of the inventive concept.

All the details may furthermore be replaced with other technically equivalent elements.

In practice, the materials employed, as well as the dimensions, may be any according to the requirements.

I claim:

1. Piston type metering pump, comprising a synchronous electric motor which is suitable for transmitting rotary motion to speed reduction means which are associated, by virtue of means suitable for converting rotary motion into reciprocating motion, with a piston element which is slidable in a hollow body in which it defines a variable-volume chamber which is associated with valve means for the intake and discharge of fluid, said speed reduction means being constituted by a worm screw which is associated with a gearwheel which meshes therewith, said gearwheel having two axial rotation pivots which are rotatably associated with walls which extend inside a housing which is fixed to said body, said means suitable for converting the rotary motion into reciprocating motion being constituted by an eccentric tab which extends from one of said pivots of said gearwheel and by a connecting rod which is rotatably associated, with one end, with an articulation pivot which is monolithic with said eccentric tab.

2. Pump according to claim 1, wherein said piston element is constituted by a piston with a cylindrical extension to which an end of said connecting rod is articulated, said piston having, on its curved outer surface, a seat for a sealing ring.

3. Piston type metering pump, comprising a synchronous electric motor which is suitable for transmitting rotary motion to speed reduction means which are associated, by virtue of means suitable for converting rotary motion into reciprocating motion, with a piston element which is slidable in a hollow body in which it defines a variable-volume chamber which is associated with valve means for the intake and discharge of fluid, said body defining a first chamber and a second chamber, said electric motor comprising a stator arranged in said first chamber and a rotor arranged in said second chamber, said speed reduction means being constituted by a worm screw which is associated with a gearwheel which meshes therewith, said worm screw being rigidly associated with a shaft which freely supports said rotor of said motor, said shaft furthermore having its ends freely inserted in respective seats, a first one of said seats extending axially from said second chamber of said body, a second one extending inside a housing which is fixed to said body.

4. Pump according to claim 3, wherein said worm screw is monolithic with a disk-like element from which a tab extends eccentrically, said tab being encompassed by a shock-absorbing rubber element and being rotationally entrained by a substantially radial tab which extends from said rotor at an open end of said second chamber.

5. Pump according to claim 3, wherein said variable-volume chamber defines a head upon which is connected an insert which is crossed by two shaped passages, respectively for the intake and discharge of fluid.

6. Pump according to claim 3, wherein said variable-volume chamber defines a head upon which is connected an insert which is crossed by two shaped passages, respectively for the intake and discharge of fluid, and wherein said valve means are constituted by an umbrella-shaped valve made of rubber, with an elastically deformable hood and a tubular body which is provided with a beak-shaped nozzle with elastically deformable sealing lips, said hollow body defining a head upon which is fixed said valve with is body.

7. Pump according to claim 3, wherein said variable-volume chamber defines a head upon which is connected an insert which is crossed by two shaped passages, respectively for the intake and discharge of fluid, and wherein said valve means are constituted by an umbrella-shaped valve made of rubber, with an elastically deformable hood and a tubular body which is provided with a beak-shaped nozzle with elastically deformable sealing lips, said hollow body defining a head upon which is fixed said valve with is body, and wherein said valve is inserted with its tubular body in a seat of the head of said hollow body, said seat being connected to the outside by means of a connection, said tubular body having an annular recess in which a complimentarily shaped raised portion, defined on the corresponding seat, is accommodated.

8. Pump according to claim 3, wherein said variable-volume chamber defines a head upon which is connected an insert which is crossed by two shaped passages, respectively for the intake and discharge of fluid, and wherein said valve means are constituted by an umbrella-shaped valve made of rubber, with an elastically deformable hood and a tubular body which is provided with a beak-shaped nozzle with elastically deformable sealing lips, said hollow body defining a head upon which is fixed said valve with is body, and wherein said nozzle of said tubular body of said umbrella-shaped valve extends on the side of said connection, its sealing lips defining a rectilinear slit.

9. Pump according to claim 3, wherein said variable-volume chamber defines a head upon which is connected an insert which is crossed by two shaped passages, respectively for the intake and discharge of fluid, and wherein said valve means are constituted by an umbrella-shaped valve made of rubber, with an elastically deformable hood and a tubular body which is provided with a beak-shaped nozzle with elastically deformable sealing lips, said hollow body defining a head upon which is fixed said valve with is body, and wherein said nozzle of said tubular body of said umbrella-shaped valve extends on the side of said connection, its sealing lips defining a rectilinear slit, and wherein the hood of said umbrella-shaped valve rests with its elastically deformable perimetric lips on a surface of said head on which said seat for its tubular body ends, a duct for connection to the outside leading onto said surface inside the perimeter of said hood.

10. Pump according to claim 3, wherein said variable-volume chamber defines a head upon which is connected an insert which is crossed by two shaped passages, respectively for the intake and discharge of fluid, and wherein said valve means are constituted by an umbrella-shaped valve made of rubber, with an elastically deformable hood and a tubular body which is provided with a beak-shaped nozzle with elastically deformable sealing lips, and wherein said head of the umbrella-shaped valve is fixed on said hollow body in which said piston element is slidable by means of coupling devices with the interposition of a hydraulic sealing ring.

11. Piston type metering pump, comprising a synchronous electric motor which is suitable for transmitting rotary motion to speed reduction means which are associated, by virtue of means suitable for converting rotary motion into reciprocating motion, with a piston element which is slidable in a hollow body in which it defines a variable-volume chamber which is associated with valve means for the intake and discharge of fluid, said synchronous electric motor being of the type with permanent magnets having a stator pack which is embedded in resin in a first chamber of a body of said pump, said motor having a rotor which is accommodated in a second chamber of said body which has an open end, said hollow body being monolithic with said motor body and being shaped complimentarily to the outer curved surface of said piston, said hollow body having, at a head of said variable-volume chamber, an expansion in which an intermediate closure element of said head and a cover which is externally provided with a hydraulic sealing ring are inserted, said cover being associated with said hollow body with snap-together couplings, said rotor of said motor being coupled with said speed reduction means by means of elastic spring means, said speed reduction means comprising a gearwheel which is axially associated with a plain bearing which is accommodated in a corresponding support of the pump body, said valve means being enclosed between two hollow elements which are accommodated in a seat of said head and being associated with a single sealing element which is suitable for preventing the internal recirculation and escape of liquid.

12. Pump according to claim 11, wherein said intermediate element and said cover are longitudinally traversed by fluid intake and discharge ducts which can be connected to a hydraulic circuit by means of connections.

13. Pump according to claim 11, wherein said elastic spring means are constituted by a cylindrical helical spring which embraces two bushes of equal diameter which extend axially respectively from said rotor and from a worm screw of said reduction means, both of which are associated with a supporting shaft.

14. Pump according to claim 11, wherein said elastic spring means are constituted by a cylindrical helical spring which embraces two bushes of equal diameter which extend axially respectively from said rotor and from a worm screw of said reduction means, both of which are associated with a supporting shaft, and wherein said spring defines ends which extend radially and one of said ends rests laterally on a tab which extends eccentrically from said rotor, the other one of said ends being inserted in a respective slot or hole of a bell-shaped element which extends axially from said worm screw.

15. Pump according to claim 11, wherein said plain bearing is constituted by a bearing in which one of a pair of end pivots of said gearwheel is inserted, said bearing having annular raised portions which prevent its axial sliding with respect to its support and having a further axial raised portion which is in contact with an annular seat which is defined laterally on said gearwheel.

16. Pump according to claim 11, wherein said sealing element suitable for preventing internal recirculation and escape of fluid is constituted by a gasket which is substantially shaped like a figure-eight, surrounds the seats of said valves, is interposed between said two hollow elements and is in external contact with said seat in which they are accommodated, said gasket having an outer circumferential raised portion which is suitable for accommodating in a complimentarily shaped recess of said seat.

17. Pump according to claim 11, wherein said single sealing element which is suitable for preventing internal recirculation and escape of fluid is constituted by a gasket which is made of rubber and is substantially shaped like a figure-eight from which spokes extend inward for connection to valves which are monolithic therewith, said gasket being interposed between said hollow elements which enclose said valves and being in external contact with said seat in which they are accommodated.

18. Pump according to claim 11, wherein said single sealing element which is suitable for preventing internal recirculation and escape of fluid is constituted by a gasket which is made of rubber and is substantially shaped like a figure-eight from which spokes extend inward for connection to valves which are monolithic therewith, said gasket being interposed between said hollow elements which enclose said valves and being in external contact with said seat in which they are accommodated, and wherein said valves, which are monolithic with said gasket by means of said spokes, are constituted by shutter elements which have outer surface regions which are shaped complimentarily to the respective seats to be closed, with which they are normally in contact.

19. Pump according to claim 11, wherein said intermediate element and said cover are longitudinally traversed by fluid intake and discharge ducts which can be connected to a hydraulic circuit by means of connections, said valve means for the intake and discharge of fluid being constituted by mushroom valves which are arranged is opposite directions in seats which are defined in said intake and discharge ducts which are present in said intermediate element and in said cover.

20. Pump according to claim 19, wherein each mushroom valve is constituted by a mushroom-shaped element with a substantially conical head which is pushed in a complimentarily shaped seat by an axial cylindrical helical spring, said mushroom-shaped element and said springs being accommodated in an enlarged portion of each of said intake and discharge ducts.

* * * * *